United States Patent [19]
Trubman

[11] 3,776,251
[45] Dec. 4, 1973

[54] ANTI-LEAKAGE SYSTEM FOR BOILER SAFETY VALVES

[75] Inventor: Abraham Trubman, Philadelphia, Pa.

[73] Assignee: The United States of America as represented by the Secretary of the Navy, Washington, D.C.

[22] Filed: June 26, 1972

[21] Appl. No.: 266,182

[52] U.S. Cl.................... 137/71, 137/489, 137/492
[51] Int. Cl............................................. F16k 17/16
[58] Field of Search................ 137/68–71, 488, 489, 137/489.5, 484.2, 492, 492.5; 220/89 A

[56] References Cited
UNITED STATES PATENTS

| 703,687 | 7/1902 | Warren | 137/489 |
| 2,580,365 | 12/1951 | Simmonds | 220/89 A X |
| 3,075,544 | 1/1963 | Heideman | 137/484.2 |
| 1,339,244 | 5/1920 | Willcox | 137/312 |

Primary Examiner—Edgar W. Geoghegan
Assistant Examiner—Richard Gerard
Attorney—R. S. Sciascia et al.

[57] ABSTRACT

The invention disclosed herein relates to an improved safety valve for high pressure steam operations and includes an auxiliary system for operating high pressure steam to the safety valve main spring to prevent leakage of a safety valve with its attendant noise and condensate.

6 Claims, 1 Drawing Figure

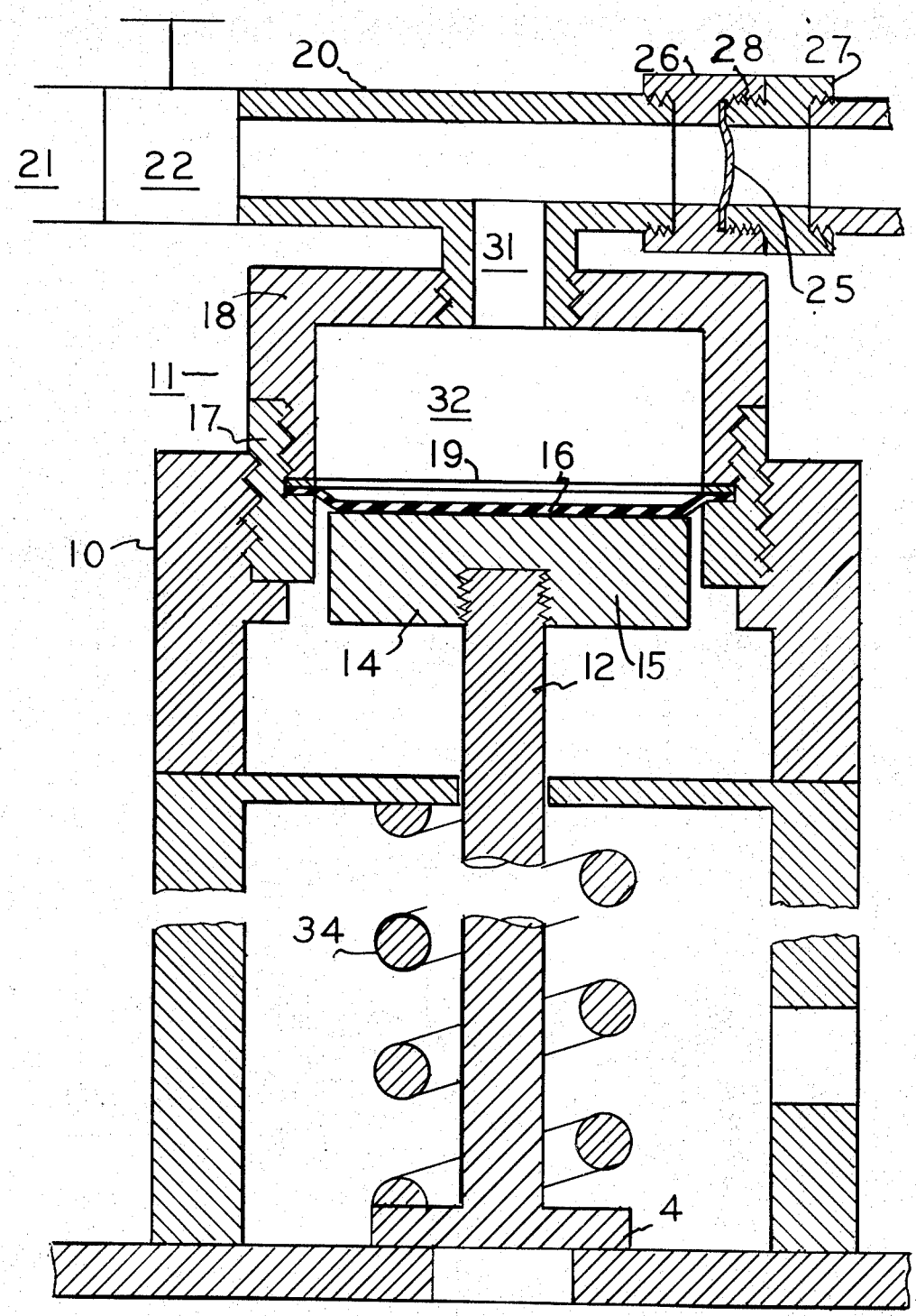
PRESSURE VESSEL

ANTI-LEAKAGE SYSTEM FOR BOILER SAFETY VALVES

Safety valves are generally used with high pressure steam and gas lines and their development is highly sophisticated. However, one of the attendant problems with existing safety valves is that when they are operated near the desired "pop off" point and lower, there may be a continuous escape of steam with attendant noise. This is caused by adjustment of the main spring of a safety valve which is such that there is a need to have a very rugged spring in the system and at the same time have one that will release at a design pressure point that creates a very finely balanced system where the net closure pressure across a steam escape port may be steadily reduced until there is very little pressure drop across the port.

A safety valve designed to release at 1,325 pounds per square inch and not release at 1,300 pounds per square inch has a pressure across the escape port of a net of 25 pounds per square inch.

Therefore it is an object of this invention to provide an improved safety valve assembly.

It is yet a further object of this invention to provide an improved safety valve system utilizing an auxiliary system for applying steam pressure to the main valve spring in the closure of the main escape port.

Still a further object of this invention is to provide an improved safety valve actuator system for utilization with a safety valve using a spring, and valve closure member having a valve rod, for overcoming pressure in a pressure vessel and actuated when the pressure in said vessel is greater than a pre-set compression of said spring, comprising; flexure means having first and second positions, the first of said positions being in contact with the valve rod for applying closure pressure a housing defining with the flexure means a closed cavity; means for coupling the effective pressure in the pressure vessel to the cavity; rupture means coupled to the coupling means; and a rupture element in the rupture means rupturable by a pre-selected value of pressure in the pressure vessel to release pressure in the cavity so that the flexure means moves to its second position and does not apply closure pressure to the valve rod.

And a further object of this invention is to provide an improved safety valve actuator system utilizing a bellows attachable to a valve rod and including a rupture element so that pressure in a vessel aids in keeping the safety valve closed up to a pre-selected value of pressure at which point the rupture element ruptures and additional pressure in the system will open the safety valve.

Other objects, advantages and novel features of the invention will become apparent from the following detailed description of the invention when considered in conjunction with the accompanying drawings wherein:

The FIGURE shows one embodiment of the invention.

A main safety valve housing 10, is provided and mounted thereto is a second housing 11. The upper end of a shaft 12 is connected to the main valve 4 of the safety valve. Mounted on the top of shaft or rod 12 is a spindle button 15 which is threaded to the end of the rod 12. Shown in contact with the spindle button 15 is a diaphragm 16 which is mounted between the base of diaphragm head element 17 and the top of diaphragm head element 18. A washer 19 provides the proper closure for this structure. It should be noted that top element 18 screws into base element 17 thru threaded portions as shown.

A T connection 20 screws into the top of diaphragm element member 18 and is connected on its one side to the boiler drum press (not shown) thru line 21, which includes a shut-off valve 22. The other side of T 20 is connected to a rupture disc element generally designated as 25. This element includes a first portion 26 screwed to the T connection 20 and a second element 27 which is mounted via threads to element 26 designated as 28 and includes a rupture element 25.

T element 20 has a port 31 which allows existing pressure in the boiler drum press to exist in the chamber or cavity 32 of diaphragm head element. The pressure in chamber 32 which is normal steam pressure causes a downward push on spindle button 15 and drives rod 12 in a downward direction. This force aids the main spring 34 of the safety valve, around rod 12, in maintaining the seating of the main valve 4. When the steam pressure reaches a critical point, pre-set by selection of rupture element 25, element 25 ruptures. The pressure in the T 20 is immediately reduced as the steam exhaust thru the ruptured disc element 25 and the pressure in chamber 32 drops. The drop in pressure of chamber 32 is aided by the use of the T. As the steam exhausts thru the rupture element and across the "T" the mouth of port 31 is in effect very similar to a venturi tube or eductor effect and a reduction in pressure occurs across element 31. The diaphragm 16 then flexes in an upward direction and releases the spindle button and releases the pressure on rod 12 and the only pressure keeping the main safety valve closed is the main safety valve spring.

If the main line pressure then goes up to the pre-set "pop off" point of the main spring, the safety valve will be actuated.

It should be noted that this system provides a warning system that the pressure in the system is approaching the point where the main safety valve will operated.

Since the valve is actuated and the steam pressure drops, then by shutting off the valve 22 a new rupture element 25 may be screwed on T 20 after the old element has been removed. The safety valve will then be ready to operate again.

It should be noted that a diaphragm 16 is shown as an element of the invention for explanation purposes. Additionally, a bellows system could be utilized or another system which applies the steam pressure to the upward end of the rod.

Obviously many modifications and variations of the present invention are possible in the light of the above teachings. It is therefore to be understood that within the scope of the appended claims the invention may be practiced otherwise than as specifically described.

I claim:

1. An improved safety valve actuator system for utilization with a safety valve having a valve closure member with an attached valve rod and a spring closing bias for overcoming pressure in a pressure vessel and actuated to an open position when the pressure in said vessel is greater than a pre-set compression of said spring, comprising;

a. flexure means having first and second positions, said first of said positions being in contact with said valve rod for transmitting a closing pressure thereto, said flexure means and said valve rod having an abutting contact therebetween;

b. a housing defining with said flexure means a closed cavity;

c. means for coupling the effective pressure in said pressure vessel to said cavity whereby said vessel pressure is applied to said valve stem through said flexure means as a valve closing pressure;

d. rupture means coupled to said coupling means; and e. a rupture element in said rupture means rupturable by a preselected value of pressure in said pressure vessel to release pressure in said cavity so that said flexure means moves to its second position in which the vessel pressure is not applied to said valve rod.

2. The device of claim 1 wherein the coupling means is connected to the cavity means thru a T connection having hollow passageway portions acting as a venturi so that release of pressure upon rupture of the rupture element causes a reduction in pressure to exist in said cavity.

3. The improved system of claim 2 wherein there is provided a shut-off valve in the coupling means.

4. The improved system of claim 3 wherein the rupture element is mounted on the T in juxtaposition to the T connection.

5. The improved system of claim 4 wherein said rupture element includes a first housing element, a second housing element mountable on said first housing element and a disc rupture element held in sealed relationship between said first and second housing elements.

6. The improved system of claim 5 wherein the rupture element upon rupture of the said disc exhausts pressure in the system to atmospherical pressure.

* * * * *